United States Patent [19]
Taniguchi et al.

[11] 4,021,843
[45] May 3, 1977

[54] COLOR TONE CONTROL DEVICE IN COLOR TELEVISION RECEIVER

[75] Inventors: Yoshisada Taniguchi, Fujisawa; Toshihiko Tsuji; Masanori Oguino, both of Yokohama, all of Japan

[73] Assignee: Hitachi, Ltd., Japan

[22] Filed: Jan. 27, 1975

[21] Appl. No.: 544,268

[30] Foreign Application Priority Data
Jan. 30, 1974 Japan .............................. 49-11891
Jan. 31, 1974 Japan .............................. 49-12995

[52] U.S. Cl. ................................................ 358/29
[51] Int. Cl.² ..................................... H04N 9/535
[58] Field of Search .................. 358/29, 28, 27, 37

[56] References Cited
UNITED STATES PATENTS

| | | | |
|---|---|---|---|
| 3,328,517 | 6/1967 | Davidse | 358/30 |
| 3,612,754 | 10/1971 | Altmanshofer | 358/29 |
| 3,617,621 | 11/1971 | Cochran | 358/28 |
| 3,639,685 | 2/1972 | Morio | 358/30 |
| 3,737,562 | 6/1953 | Matzek | 358/29 |
| 3,749,825 | 7/1973 | Moore | 358/28 |
| 3,764,826 | 10/1973 | Okada | 358/27 |
| 3,783,186 | 1/1974 | Slavik | 358/28 |
| 3,812,524 | 5/1974 | Ivas et al. | 358/28 |
| 3,843,958 | 10/1974 | Furrey | 358/27 |
| 3,864,723 | 2/1975 | Carpenter | 358/27 |

*Primary Examiner*—John C. Martin
*Attorney, Agent, or Firm*—Craig & Antonelli

[57] ABSTRACT

Red, blue and green color difference signals are supplied to the bases of first, second and third transistors amplifying the tri-color signals of red, blue and green, and a luminance signal is introduced to the emitter of each transistor through a parallel circuit of two resistors. One of the resistors in each parallel circuit is connected through a switch. The switches are associatively operated so that the on-off operation of the switch connected to the emitter of the first transistor is opposite to that of the switches connected to the emitters of the second and the third transistor. By operating the switches, the amplification degree of the first transistor is increased and simultaneously the amplification degrees of the second and third transistors are decreased, and therefore an image with red emphasized can be obtained with no change in luminance.

7 Claims, 4 Drawing Figures

COLOR TONE CONTROL DEVICE IN COLOR TELEVISION RECEIVER

This invention relates to a tone color control device in a color television receiver which can emphasize a particular color.

It is an important matter of concern for viewers to reproduce a beautiful image on the picture tube of a color television receiver. However, a color tone of an image suitable to the tastes of viewers is not always constant, and furthermore the viewer's choice of a color tone of an image is varied by illumination in a room where the color television receiver is provided and other conditions. In addition, the present color television broadcastings are different in hue and the like depending on television broadcasting stations and the contents of television broadcasting programs. For this reason, a color television receiver is provided with a color saturation control device and a hue control device. The former operates to change the amplitude of a carrier color signal, with the result that the light and shade of all of the colors is changed. The operation of the latter changes a phase difference between a color burst signal and a carrier signal, with the result that all of the colors are changed.

If the color tone of an image is adjusted by the color saturation control device or the hue control device, all of the colors are changed. Therefore, in this method, it is impossible to emphasize a particular color, for instance red only, according to a viewer's taste and image viewing conditions.

Accordingly, an object of this invention is to provide a color tone control device in a color television receiver which is capable of emphasizing a particular color.

Another object of this invention is to provide a color tone control device in a color television receiver which is capable of emphasizing a particular color without change in image luminance.

According to this invention, there is provided a color tone control device in a color television receiver which device comprises; a first amplifier for producing a first primary color signal by receiving a luminance signal and a first color difference signal; a second amplifier for producing a second primary color signal by receiving a luminance signal and a second color difference signal; a third amplifier for producing a third primary color signal by receiving a luminance signal and a third color difference signal; a first device for obtaining a white balance taken to be generally preferable by adjusting the amplification degrees of two of the three amplifiers, and a second device for adjusting the amplification degree of at least one of the three amplifiers.

Preferably, the second device has means which when the amplification degree of one of the three amplifiers is increased, operates to decrease the amplification degree of at least one of the remaining amplifiers.

In the above-described color tone control device, each of the amplifiers comprises a transistor to the base of which the respective color difference signal is applied, a load resistance connected to the collector of the transistor, and a resistor through which the respective luminance signal is applied to the emitter of the transistor; the first device comprises first means for varying the resistance of one of the resistors connected to one transistor and second means for varying the resistance of one of the resistors connected to another transistor; and the second device comprises third means for varying the resistance of a resistor connected to at least one transistor apart from the first device.

The first and second means are means for connecting variable resistors to transistors, respectively, and the third means is means for connecting through a switch a resistor in parallel to a resistor connected to at least one transistor.

More specifically, the third means comprises means for connecting through a first switch a first resistor in parallel to a resistor connected to a first transistor, means for connecting through a second switch a second resistor in parallel to a resistor connected to a second transistor, and means for associatively operating the first and second switches so that when the amplification degree of one of the first and second transistors is increased, the amplification degree of the other transistor is simultaneously decreased.

The foregoing objects of this invention will become more apparent from the following detailed description and the appended claims when read in conjunction with the accompanying drawings, in which like parts are designated by like reference numerals.

In the accompanying dawings:

Figure 1:
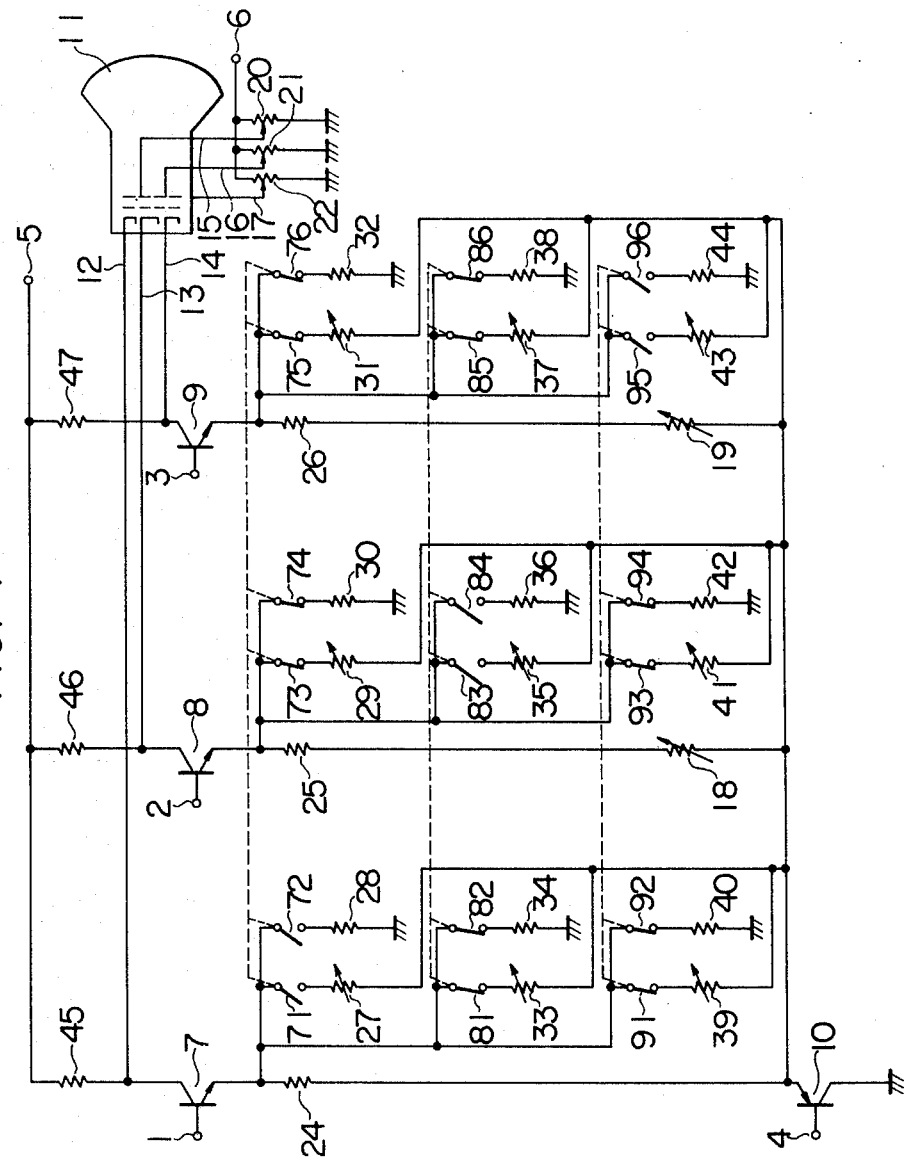
FIG. 1 is a circuit diagram of one example of a color tone control device according to this invention.

A preferred example of a tone color control device according to this invention is shown in a circuit diagram of FIG. 1 which comprises terminals 1, 2 and 3 to which red, blue and green color difference signals are applied, a terminal 4 to which a luminance signal is applied, terminals 5 and 6 to which D.C. voltages are applied, transistors 7, 8 and 9 which are adapted to amplify primary colors of red, blue and green respectively, a transistor 10 for amplifying the luminance signal, a color picture tube 11, cathodes 12, 13 and 14 of the color picture tube 11, second grids 15, 16 and 17 of the color picture tube 11, variable resistors 18 through 22, resistors 24 through 47, switches 71 through 76 operatively associated with one another, and switches 81 though 86 operatively associated with one another. Resistors 27, 29, 31, 33, 35, 37, 39, 41 and 43 are illustrated as variable resistors. However, fixed resistors may be used in their place.

The base of the resistor 7 is connected to the terminal 1, the collector of the same is connected to the cathode 12 of the color picture tube 11 and is connected to the terminal 5 through the resistor 45, and the emitter of the same is connected through the resistor 24 to the emitter of the transistor 10. In parallel to this resistor 24, the resistors 27, 33 and 39 are connected through the switches 71, 81 and 91, respectively. The emitter of the transistor 7 is connected through the switch 72 to one terminal of the resistor 28 whose other terminal is grounded, through the switch 82 to one terminal of the resistor 34 whose other terminal is grounded, and through the switch 92 to one terminal of the resistor 40 whose other terminal is grounded. The base of the transistor 10 is connected to the terminal 4, and the collector of the same is grounded.

The base of the transistor 8 is connected to the terminal 2, and the collector of the same is connected through the resistor 46 to the terminal 5 and to the cathode 13 of the picture tube 11. The emitter of the transistor 8 is connected through a series circuit of the resistor 25 and the variable resistor 18 to the emitter of the transistor 10. In parallel to the series circuit, the resistors 29, 35 and 41 are connected through the switches 73, 83 and 93, respectively. The emitter of the transistor 8 is further connected through the switch 74 to one terminal of the resistor 30 whose other terminal is grounded. through the switch 84 to one terminal of the resistor 36 whose other terminal is grounded, and through the switch 94 to one terminal of the resistor 42 whose other terminal is grounded.

The base of the transistor 9 is connected to the terminal 3, and the collector of the same is connected through the resistor 47 to the terminal 5 and is connected to the cathode 14 of the picture tube 11. The emitter of the transistor 9 is connected through a series circuit of the resistor 26 and the variable resistor 19 to the emitter of the transistor 10. In parallel to this series circuit, the resistors 31, 37 and 43 are connected through the switches 75, 85 and 95, respectively. The emitter of the transistor 9 is connected through the switch 76 to one terminal of the resistor 32 whose other terminal is grounded, through the switch 86 to one terminal of the resistor 38 whose other terminal is grounded, and through the switch 76 to one terminal of the resistor 44 whose other terminal is grounded.

Since the switches 71 through 76 are operatively associated with one another, upon operation of these switches, these switches take a first condition in which the switches 71 and 72 are off while the switches 73 through 76 are on, and a second condition in which the switches 71 and 72 are on while the switches 73 through 76 are off.

Similarly as in the case of the switches 71 through 76, the switches 81 through 86 are operatively associated with one another. Therefore, the switches 81 through 86 take a first condition in which the switches 83 and 84 are off while the switches 81, 82, 85 and 86 are on, and a second condition in which the switches 83 and 84 are on while the switches 81, 82, 85 and 86 are off.

In addition, the switches 91 through 96 are also operatively associated with one another, and therefore these switches take a first condition in which the switches 95 and 96 are off while the switches 91 through 94 are on, and a second condition in which the switches 95 and 96 are on while the switches 91 through 94 are off.

The amplification degrees of the primary color amplifying transistors 8 and 9 are adjusted by means of the variable resistors 18 and 19, respectively, and the grid voltages of the picture tube 11 are adjusted by means of the variable resistors 20, 21 and 22, respectively so that when all of the switch assemblies 71 through 76, 81 through 86, and 91 through 96 take the respective first conditions, an image having color tone considered generally preferable is reproduced. The luminance signal (−Y) applied to the terminal 4 is obtained as an output of a luminance signal processing circuit. After having been amplified by the transistor 10, the luminance signal (−Y) is introduced to the emitter of the transistor 7 through a parallel circuit of the resistors 24, 33 and 39, and is supplied to the emitter of the transistor 8 through a series circuit of the resistor 25 and the variable resistor 18 and a parallel circuit of the resistors 29 and 41, and is further applied to the emitter of the transistor 9 through a series circuit of the resistor 26 and the variable resistor 19 and a parallel circuit of the resistors 31 and 37.

A red color difference signal (R−Y), a blue color difference signal (B−Y), and a green color difference signal (G−Y) applied respectively to the terminals 1, 2 and 3 are obtained as outputs of the color signal processing circuit, and are applied to the bases of the transistors 7, 8 and 9, respectively. In this connection, since the luminance signal (−Y) is applied to the emitters of the transistors 7, 8 and 9, the primary colors (R), (B) and (G) are generated at the collectors of the transistors 7, 8 and 9, respectively. The circuit shown in FIG. 1 is so designed that these primary color signals (R), (B) and (G) are applied to the cathodes 12, 13 and 14 of the picture tube 11, respectively; however, they may be applied to the first grids of the picture tube 11.

The primary color signals (R), (B) and (G) are determined by the amplification degress of the transistors 7, 8 and 9, and the amplification degree of each of the transistors 7, 8 and 9 is proportional to the ratio of the collector resistance to the emitter resistance of the transistor. Accordingly, the magnitude of the blue color signal (B) can be controlled by the variable resistor 18, and the magnitude of the green color signal (G) can be controlled by the variable resistor 19. These variable resistors 18 and 19 are provided for correcting the white balance when the brightness degree is high, that is, the fluctuation in light-emitting efficiency of each primary color fluorescent material of the picture tube 11. The variable resistors 20, 21 and 22 are employed of controlling the biases of the second grids 15, 16 and 17 of the picture tube 11 thereby to control the white balance when the brightness degree is high. In other words, the variable resistors 18 and 19 are used when the primary color signals are great in magnitude, that is, they are used to control the white balance when the luminance is high, while the variable resistors 20, 21 and 22 are used when the primary color signals are small in magnitude, that is, they are provided for controlling the white balance when the luminance is low. In general, these variable resistors 18 through 22 are provided inside the cabinet of the color television receiver, and therefore it is impossible for a viewer to operate these variable resistors as desired.

The on-off condition of the picture tube 11 with respect to the same input is changed by changing the biases of the second grids 15, 16 and 17 of the picture tube 11 and also be changing the D.C. biases of the cathodes 12, 13 and 14, that is, the resistances between the ground and the emitters of the transistors 7, 8 and 9.

When the conditions of only the switches 71 through 76 operatively associated with one another is changed to the second condition from the first condition while the other switches 81 through 86 and 91 through 96 are maintained under the respective first conditions, a red color is emphasized. When the condition of the switches 81 through 86 operatively associated with one another are changed to the second condition from the first condition while the other switches 71 through 76 and 91 through 96 are kept under the respective first condition, a blue color is emphasized. Similarly, when the condition of the switches 91 through 96 is changed to the second condition from the first condition while the other switches 71 through 76 and 81 through 86 are kept under the respective first conditions, a green color is emphasized.

The case where a red color is emphasized by changing the condition of the switches 71 through 76 to the second condition from the first condition will be described. However, the case where a blue color or a green color is emphasized will not be described because it is similar to the case of emphasizing a red color.

When the condition of the switches 71 through 76 is changed from the first condition to the second condition, the resistance between the emitter of the transistor 7 and the emitter of the transistor 10 is reduced, while the resistance between the emitter of the transistor 8 and the emitter of the transistor 10 and the resistance between the emitter of the transistor 9 and the emitter of the transistor 10 are increased. That is, the amplification degree of the transistor 7 is increased, while the amplification degrees of the transistors 8 and 9 are decreased. Accordingly, the red signal (R) is increased in magnitude, while the blue signal (B) and the green signal (G) are decreased in magnitude. As a result, when the luminance is high, a white balance with a red emphasized is obtained.

When the condition of the switches 72, 74 and 76 is changed to the second condition from the first condition, the resistance between the emitter of the transistor 7 and the ground is decreased, and the D.C. bias of the cathode 12 is increased, with the result that a red beam current is increased. At the same time, the resistance between the emitter of the transistor 8 and the ground and the resistance between the emitter of the transistor 9 and the ground are increased, with the result that a blue beam current and a green beam current in the vicinity of the cutoff are decreased. That is, when the luminance is low, a white balance with a red emphasized is obtained.

However, even if the white balance during the period of the low luminance is not taken into consideration, that is, the switches 72, 74 and 76 and the resistors 28, 30 and 32 are not provided, the red can be sufficiently emphasized.

It is important to increase the amplification degree of the transistor 7 and to decrease the amplification degrees of the transistors 8 and 9. Emphasizing the red can be achieved by increasing the amplification degree of the transistor 7 or by decreasing the amplification degrees of the transistors 8 and 9. However, if only one of the two methods is conducted to emphasize the red, the brightness of the image is changed. This is disadvantageous. That is, when the red is emphasized by changing over the switches 71 and 72, the brightness of the image is changed. In order to prevent this disadvantageous phenomenon, according to the example the switches 71 and 72 and the switches 73 through 76 are simultaneously operated so as to increase the amplification degree of one transistor and to decrease that of the other transistor.

The circuit shown in FIG. 1 is so designed to emphasize the tri-color. However, if the circuit is so designed that the switch 73 is on under the first condition and off under the second condition, it is possible to simultaneously emphasize red and blue that is, violet. In case of emphasizing red and blue at the same time, a red emphasizing degree and a blue emphasizing degree are determined by the selection of values of the resistors 27 through 31. That is, colors of from red tinged with blue to blue tinged with red can be emphasized by selecting the values of the resistors 27 through 31. All of the colors can be emphasized by combining the degrees of emphasizing the primary colors. In order to increase a number of colors to be emphasized, it is necessary to increase a number of resistors and also a number of swtiches. In the case of emphasizing red only, the switches 81 through 86 and 91 through 96, and the resistors 33 through 38 and 39 through 44 are unnecessary. Since it is determined by a viewer to select a color to be emphasized, the controls of the gang-operated switches 71 through 76, 81 through 86 and 91 through 96 should be provided on the external surface of the television receiver cabinet.

Figure 2:
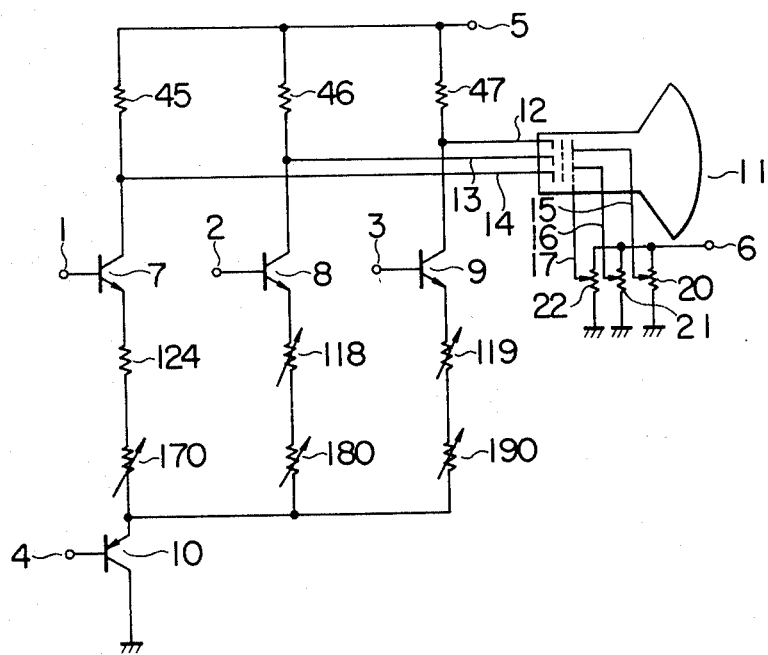
FIG. 2 is also a circuit diagram of another example of the color tone control device according to the invention.

FIG. 2, unlike the example described above, shows a circuit diagram of a color tone control circuit of a color television receiver in which a color to be emphasized can be continuously changed.

In FIG. 2, a series circuit of a resistor 124 and a variable resistor 170 is connected between the emitter of a transistor 7 and the emitter of a transistor 10, a series circuit of variable resistors 118 and 180 is connected between the emitter of a transistor 8 and the emitter of the transistor 10, and a series circuit of variable resistors 119 and 190 is connected between the emitter of a transistor 9 and the emitter of the transistor 10. Unlike the circuit diagram shown in FIG. 1, no resistor is connected between the ground and the emitters of the transistors 7, 8 and 9. However, the other connection of the circuit elements is made in the same manner as that in FIG. 1.

The variable resistors 118 and 119 are provided for obtaining the white balance which is taken to be in general preferable when the variable resistors 170, 180 and 190 are set at the respective predetermined values. The variable resistors 118 and 119 are provided inside the cabinet, similarly as in the case of the variable resistors 18 and 19 in FIG. 1. Since the emitter resistance of the transistor 7 is increased or decreased by the operation of the variable resistor 170, a red component in an image can be increased or decreased by increasing or decreasing the red signal by operating the variable resistor 170. Similarly, a blue component of the image can be controlled by operating the variable resistor 180, and a green component of the image can be controlled by operating the variable resistor 190. Thus, the primary color components of the image can be continuously increased or decreased, and therefore all of the colors can be emphasized.

The color tone control circuits shown in FIGS. 1 and 2 are so designed that the amplification degrees of the transistors 7, 8 and 9 are changed by changing the emitter resistances of the transistors 7, 8 and 9. However, since the amplification degrees of the transistors 7, 8 and 9 are substantially determined by the ratio of the collector resistance to the emitter resistance, the color tone control circuits may be designed so that the collector resistance of the transistors 7, 8 and 9 are changed. Furthermore, the primary color signals (R), (B) and (G) may be supplied to the first grids of the picture tube 11 instead of the cathodes 12, 13 and 14 of the same.

Figure 4:
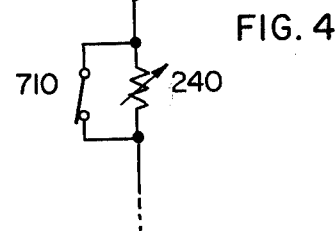
FIG. 4 illustrates a portion of the diagram shown in FIG. 1 and depicts an alternative embodiment of a color tone device according to the present invention.

FIG. 4 illustrates a portion of the diagram shown in FIG. 1. Another variable resistor 240 has been placed in series with resistor 24 and by opening switch 710, resistor 240 is inserted in the emitter circuit of transistor 7. In a similar fashion, resistor 240 and switch 710 could be connected in series with resistor 45 on the collector side of transistor 7. It is, of course, understood that similar ganged resitor-switch combinations may also be connected to the emitter or collector circuits of transistors 8 and 9.

The examples shown in FIGS. 1 and 2, are so designed that all of the primary color signals are changed in magnitude. However, the examples may be modified so that one or two of the primary color signals are changed in magnitude. In this case, the number of or the range of colors which can be emphasized is decreased, but the number of switches or variable resistors can be decreased.

In the circuit shown in FIG. 2, two variable resistors may be replaced with one variable resistor. For instance, the variable resistors 170 and 180 are removed, and instead a variable resistor is connected in the following manner. One of the stationary terminals of this resistor is connected to one terminal of the resistor 124, and the other stationary terminal of the variable resistor is connected to one terminal of the variable resistor 118. The sliding terminal of the variable resistor is connected to the emitter of the transistor 10. If the variable resistor is connected in the manner described above, the emitter resistance of one transistor decreases with the increase of the emitter resistance of the other transistor, and therefore it is possible to prevent the change of the luminance.

Figure 3:
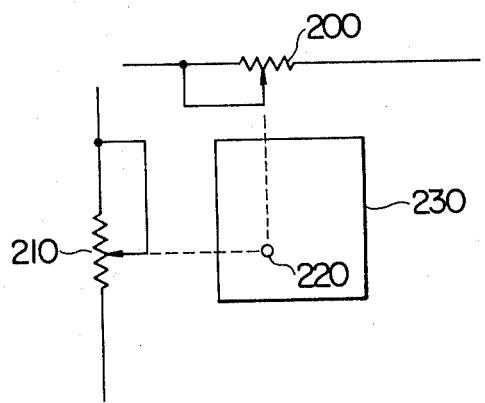
FIG. 3 is a diagram showing a movable range of area of an operating lever which is operated to control two variable resistors for improving the operability of the color tone control device shown in FIG. 2.

In addition, shown in FIG. 3 is a device which is adapted to operate two variable resistors with one operating lever whose operating range is limited. If this device is employed in place of two of the three variable resistors 170, 180 and 190, the color tone control can be readily achieved. The resistance of variable resistors 200 and 210 shown in FIG. 3 are changed by one operating lever 220. When the operating lever 220 is moved upward or downward the resistance of the variable resistor 200 is not changed at all, but the resistance of the variable resistor 210 is changed. When the operating lever 220 is moved rightward or leftward, only the resistance of the variable resistor 200 is changed. If the operating lever 220 is moved in a diagonal or slant direction, both of the resistances of the variable resistors 200 and 210 are changed simultaneously. Such a device is employed in the four-channel stereophonic system for the purpose of taking balance between the channels by adjusting the amplification degrees of the channels. In the device employed in the four-channel stereophonic system, a pair of variable resistors for adjusting the amplification degrees in the front and rear channels and a pair of variable resistors for adjusting the amplification degrees in the right and left channels are independently operated, and the variable resistors in each pair are operatively associated with each other.

If colors emphasized in correspondence to the positions of the operating lever 220 are indicated on a lever operating area 230, it will facilitate the color emphasizing operation by the lever 220.

As was described above, according to this invention, by changing the amplification degree of any of the primary color signal amplifying transistors 7, 8 and 9, for instance by decreasing the emitter resistance, a color corresponding to a color signal amplified by the transistor can be emphasized, and therefore it is possible to provide a color tone control circuit simple in construction. Furthermore, in this invention, in the case when the emitter resistance of one of the transistors 7, 8 and 9 is decreased, the variation in luminance can be corrected by increasing the emitter resistance of one or two of the remaining transistors.

What is claimed is:

1. A color tone control device in a color television receiver comprising:
    a source of a luminance signal;
    a source of color difference signals;
    means for generating primary color signals by matrixing
    first color tone setting means for setting intensities of said primary color signals to reproduce on the receiver a color image with a generally preferably white balance;
    second color tone setting means for setting the intensities of said primary color signals to reproduce on said receiver another color image with another white balance in which a particular color is emphasized; and
    switching means having at least two switching positions for switching said white balances from one to another and vice versa, said switching means in one switching position thereof causing said first color tone setting means to effect to reproduce an image with said generally preferable white balance and in another switching position thereof causing said second color tone setting means to effect to reproduce an image with said another white balance emphasized in said particular color;
    and in which said means for generating three primary color signals comprises:
    a first amplifier for applying a first primary color signal to a color picture tube by receiving a first color difference signal and a luminance signal;
    a second amplifier for applying a second primary color signal to said color picture tube by receiving a second color difference signal and said luminance signal; and
    a third amplifier for applying a third primary color signal to said color picture tube by receiving a third color differenc signal and said luminance signal; and
    in which each of said amplifiers comprises a transistor, a first resistor connected to the emitter of said transistor, and a second resistor connected to the collector of said transistor, different color difference signals being applied to the bases of said different transistors respectively, said luminance signal being applied to the emitters of said transistors through said first resistors respectively, a D.C. voltage being applied to the collectors of said transistors through said second resistors respectively; and in which said first color tone setting means comprises first means connecting a third resistor in parallel to said first resistor of said first amplifier through a first switch, and second means connecting a fourth resistor in parallel to said first resistor of said second amplifier through a second switch, and in which said switching means comprises said first and second switches operating in such a manner that the on-off operation of said first switch is opposite to that of said second switch.

2. In a color tone control device for a color television receiver having a first amplifier for applying a first primary color signal to a color picture tube by receiving a first color difference signal and a luminance signal, a second amplifier for applying a second primary color signal to said color picture tube by receiving a second color difference signal and said luminance signal, a third amplifier for applying a third primary color signal to said color picture tube by receiving a first color difference signal and said luminance signal, and a first color tone setting device for setting a color tone with a generally preferable white balance by setting amplification factors of said three amplifiers, the improvement which comprises:

a second color tone setting device for setting another color tone with another white balance emphasized in a particular color by setting amplification factor of at least one out of said three amplifiers which factor is different from that originally set by said first setting device; and switching means having two switching positions for switching said color tones, in one switching position thereof said color tone with said generally preferable white balance being obtained by said first color tone setting device, and in another switching position thereof said another color tone with another white balance emphasized in said particular color being obtained by said second color tone setting device; and which comprises a D.C. voltage source for supplying a D.C. voltage to said amplifiers, a luminance signal source for supplying a luminance signal to said amplifiers, and first, second and third color difference signal sources for producing said first, second and third color difference signals, one terminal of said D.C. voltage source, one terminal of said luminance signal source and one terminal of each of said color difference signal sources being connected together, said first amplifier comprising a transistor whose base is connected to the other terminal of said first color difference signal source, a first resistor connected between the collector of said transistor and the other terminal of said D.C. voltage source, and a second resistor connected between the emitter of said transistor and the other terminal of said luminance signal source, said second amplifier comprising a transistor whose base is connected to the other terminal of said second color difference signal source, a third resistor connected between the collector of said transistor and the other terminal of said D.C. voltage source, and a fourth resistor connected between the emitter of said transistor and the other terminal of said luminance signal source, said third amplifier comprising a transistor whose base is connected to the other terminal of said third color difference signal source, a fifth resistor connected between the collector of said transistor and the other terminal of said D.C. voltage source, and a sixth resistor connected between the emitter of said transistor and said luminance signal source, said first device comprising means connecting through a first switch a seventh resistor in parallel to said second resistor, means connecting an eighth resistor through a second switch in parallel to said fourth resistor, means connecting a ninth resistor through a third switch in parallel to said sixth resistor, and means for associatively operating said first, second and third switches in such a manner that an on-off condition of said first switch is opposite to that of said second and third switches, said second device comprising means connecting through a fourth switch a tenth resistor in parallel to said second resistor, means connecting through a fifth switch an eleventh resistor in parallel to said fourth resistor, means connecting through a sixth a twelfth resistor in parallel to said sixth resistor, and means for associatively operating said fourth, fifth and sixth switches in such a manner that an on-off condition of said fifth switch is opposite to that of said fourth and sixth switches, said third device comprising means connecting through a seventh switch a thirteenth resistor in parallel to said second resistor, means connecting through an eighth switch a fourteenth resistor in parallel to said fourth resistor, means connecting through a ninth switch a fifteenth resistor in parallel to said sixth resistor, and means for associatively operating said seventh, eighth and ninth switches in such a manner that an on-off condition of said ninth switch is opposite to that of said seventh and eighth switches.

3. A color tone control device in a color television receiver comprising:

a source of a luminance signal;

a source of color difference signals;

means for generating three primary color signals by matrixing said luminance signal and said color difference signals;

first color tone setting means for setting intensities of said three primary color signals to reproduce on the receiver a color image with a generally preferably white balance;

second color tone setting means for setting the intensities of said three primary color signals in such a manner that the intensity of at most two out of said three primary color signals is increased from that determined by said first setting means while the intensity of at least one of the remaining ones of said three primary color signals is decreased from that determined by said first setting means to reproduce on said receiver another color image with another while balance in which a particular color is emphasized; and switching means having at least two switching positions for switching said white balances from one to another and vice versa, said switching means in one switching position thereof causing said first color tone setting means to effect to reproduce an image with said generally preferably white balance and in another switching position thereof causing said second color tone setting means to effect to reproduce an image with said another white balance emphasized in said particular color without changing brightness of the image reproduced in both switching positions.

4. A color tone control device as claimed in claim 3, in which said means for generating three primary color signals comprises:

a first amplifier for applying a first primary color signal to a color picture tube by receiving a first color difference signal and a luminance signal;

a second amplifier for applying a second primary color signal to said color picture tube by receiving a second color difference signal and said luminance signal;

a third amplifier for applying a third primary color signal to said color picture tube by receiving a third color difference signal and said luminance signal; and which further comprises a D.C. voltage source for supplying a D.C. voltage to said amplifiers, one terminal of said D.C. voltage source, one terminal of said luminance signal source and one terminal of each of said color difference signal sources being connected together, said first amplifier comprising a transistor whose base is connected to the other terminal of said first color difference signal source, a first resistor connected between the collector of said transistor and the other terminal of said D.C. voltage source, and a second resistor connected between the emitter of said transistor and the other terminal of said luminance signal source, said second amplifier comprising a transistor whose base is connected to the other terminal of said second color difference signal source, a third resistor connected between the collector of said transistor and the other terminal of said D.C. voltage source, and a fourth resistor connected between the emitter of said transistor and the other terminal of said luminance signal source, said third amplifier comprising a transistor whose base is connected to the other terminal of said third color difference signal source, a fifth resistor connected between the collector of said transistor and the other terminal of said D.C. voltage source, and a sixth resistor connected between the emitter of said transistor and said luminance signal source, said first color tone setting means comprising first means employing as a variable resistor one of said third and fourth resistors, and a second means for employing as a variable resistor one of said fifth and sixth resistors, said second color tone setting means comprising means for inserting a variable resistor in parallel to a resistor connected one of the emitter and collector of a transistor in at least one amplifier.

5. A color tone control device as claimed in claim 4, in which said second color tone setting means comprises means for inserting a variable resistor in series with a resistor connected to one of the emitter and collector of each of said transistors.

6. In a color tone control device for a color television receiver having a first amplifier for applying a first primary color signal to a color picture tube by receiving a first color difference signal and a luminance signal, a second amplifier for applying a second primary color signal to said color picture tube by receiving a second color difference signal and said luminance signal, a third amplifier for applying a third primary color signal to said color picture tube by receivng a first color difference signal and said luminance signal, and a first color tone setting device for setting a color tone with a generally preferable white balance by setting amplification factors of said three amplifiers, the improvement which comprises:

a second color tone setting device for setting another color tone with another white balance emphasized in a particular color by setting amplification factor of at least one but not more than two out of said three amplifiers which factor is different and increased from that originally set by said first setting device and concurrently by setting amplification factor of at least one but not more than two out of the remaining ones of said three amplifiers which factor is different and decreased from that originally set by said first setting device; and switching means having two switching position for switching said color tones, in one switching position thereof said color tone with said generally preferable white balance being obtained by said first color tone setting device, and in another switching position thereof said another color tone with another white balance emphasized in said particular color being obtained by said second color tone setting device without changing brightness of an image reproduced in both switching positions of said switching means.

7. A color tone control device in a color television receiver having a first amplifier for applying a first primary color signal to a color picture tube by receiving a first color difference signal and a luminance signal, a second amplifier for applying a second primary color signal to said color picture tube by receiving a second color difference signal and said luminance signal, a third amplifier for applying a third primary color signal to said color picture tube by receiving a third color difference signal and said luminance signal, and a preferable color tone setting device for setting a color tone with a generally preferable white balance by setting amplification factors of two out of said three amplifiers characterized by:

a first emphasizing device for increasing an amplification factor of said first amplifier and simultaneously decreasing an amplification factor of at least one of said second and third amplifiers to obtain a first emphasized color tone with a white balance emphasized in a first primary color represented by said first primary color signal;

a second emphasizing device for increasing an amplification factor of said second amplifier and simultaneously decreasing an amplification factor of at least one of said first and third amplifiers to obtain a second emphasized color tone with a white balance emphasized in a second primary color represented by said second primary color signal;

a third emphasizing device for increasing an amplification factor of said third amplifier and simultaneusly decreasing an amplification factor of at least one of said first and second amplifiers to obtain a third color tone with a white balance emphasized in a third primary color represented by said third primary color signal; and switching means having four switching positions for selecting one of said four color tones in such a manner that in a first switching position thereof the color tone with said generally preferably white balance by said preferable setting device, in a second switching position thereof said first emphasized color tone by said first emphasizing device, in a third switching position thereof and said second emphasized color tone by said second emphasizing device, and in a fourth switching position thereof said third emphasized color tone by said third device are respectively obtained.

* * * * *